United States Patent
Elangovan et al.

(10) Patent No.: US 10,587,150 B1
(45) Date of Patent: Mar. 10, 2020

(54) AMBIENT RF BACKSCATTER COMMUNICATION FOR VEHICLE REMOTE CONTROL

(71) Applicant: FORD GLOBAL TECHNOLOGIES, LLC, Dearborn, MI (US)

(72) Inventors: Vivekanandh Elangovan, Canton, MI (US); Aaron M. DeLong, Toledo, OH (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/217,343

(22) Filed: Dec. 12, 2018

(51) Int. Cl.
| | |
|---|---|
| *G06K 7/08* | (2006.01) |
| *H02J 50/20* | (2016.01) |
| *G06K 7/10* | (2006.01) |
| *B60R 25/40* | (2013.01) |
| *B60R 25/24* | (2013.01) |

(52) U.S. Cl.
CPC ............ *H02J 50/20* (2016.02); *B60R 25/403* (2013.01); *G06K 7/10188* (2013.01); *G06K 7/10297* (2013.01); *B60R 25/241* (2013.01); *B60R 2325/105* (2013.01)

(58) Field of Classification Search
CPC ...... G06K 7/0008; G06F 3/1454; G06F 3/147
USPC ......................................................... 235/451
See application file for complete search history.

(56) References Cited

U.S. PATENT DOCUMENTS

| | | | |
|---|---|---|---|
| 7,400,253 | B2 | 7/2008 | Cohen |
| 10,033,424 | B2 | 7/2018 | Gollakota et al. |
| 2007/0107766 | A1 | 5/2007 | Langley, II et al. |
| 2007/0115192 | A1 | 5/2007 | Brandwein, Jr. |
| 2011/0115605 | A1 | 5/2011 | Dimig et al. |
| 2011/0309686 | A1 | 12/2011 | Scherbenski et al. |
| 2014/0266594 | A1* | 9/2014 | Reiser ............... B60R 25/24 340/5.72 |
| 2015/0077225 | A1* | 3/2015 | Proefke ............ G07C 9/00182 340/5.72 |
| 2016/0325710 | A1* | 11/2016 | Honkanen ......... B60R 25/2081 |
| 2017/0280282 | A1 | 9/2017 | Pandian |
| 2018/0134253 | A1* | 5/2018 | Zielinski ............. B60R 25/241 |
| 2018/0162321 | A1* | 6/2018 | Spiess ................ B60R 25/246 |

OTHER PUBLICATIONS

Vincent Liu, et al, Ambient Backscatter: Wireless Communication Out of Thin Air (ICCE), 2011.
Nguyen Van Huynh, et al, Ambient Backscatter Communications: A Contemporary Survey, arXiv:1712.04804v1 [cs.NL] Dec. 13, 2007.

(Continued)

*Primary Examiner* — Ahshik Kim
(74) *Attorney, Agent, or Firm* — Frank L. Lollo; MacMillan, Sobanski & Todd, LLC

(57) ABSTRACT

A vehicle communicates with a remote key fob while ensuring an RF environment is sufficient to maintain adequate power from an RF-harvesting power supply that allows the fob to operate without a battery. The vehicle has a receiver adapted to detect a backscatter communication signal from the fob. A harvesting emulator in the vehicle is responsive to ambient RF around the vehicle to duplicate a concurrent response of the fob power supply. A vehicle-powered RF transmitter is activated to broadcast energizing RF radiation around the vehicle when the duplicated response is below a threshold.

20 Claims, 4 Drawing Sheets

(56) References Cited

OTHER PUBLICATIONS

Georgios Vougioukas, et al, Practical Energy Harvesting for Batteryless Ambient Backscatter Sensors, Electronics 2018, 7, 95; doi:10.3390/electronics7060095.
Jasmin Grosinger, Backscatter Radio Frequency Systems and Devices for Novel Wireless Sensing Applications, Vienna, Aug. 2012.

* cited by examiner

AMBIENT RF BACKSCATTER COMMUNICATION FOR VEHICLE REMOTE CONTROL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to backscatter communication performed by a mobile unit powered by an RF harvesting power supply, and, more specifically, to vehicle communication for ensuring an RF environment sufficient to maintain adequate power from the RF harvesting power supply.

Backscatter uses the reflection of incident radio signals as a means of communication. Devices that backscatter RF generally require very little power (e.g., a few microwatts to tens of microwatts) and can actually be powered by incident radio signals in the local RF environment (including the RF signal being backscatter and/or other incident RF radiation). This enables RF identification (RFID) tags that do not require a battery.

In some types of RFID systems employing backscatter, an active reader transmits a signal to a battery-less tag. Some tags may have the capability to convert the frequency of the transmitted signal to a different backscattered frequency. The tag uses the energy of the incoming signal to power a controller that alternates an impedance of an antenna to modulate the signal and reflect the signal back with new information that can be decoded by the reader.

Passenger vehicles typically employ a remote keyless entry (RKE) system wherein a wireless key fob carried by a user communicates with an RKE receiver in the vehicle to provide remote user access to functions such as locking and unlocking of doors and trunk, powered opening and closing of liftgates, car finder, panic alarm, activation of lights, and remote engine start. Known key fobs employ active transmitters which require batteries. It would be desirable to eliminate batteries to provide more convenience to the user, improved structural robustness, and lower cost.

Key fobs may include devices carried by the vehicle user (e.g., in a pocket or purse) as well as keypad units that are attached to the vehicle exterior which work via RF without direct connection to the vehicle electrical system. The invention also applies to other RF signaling systems in a vehicle such as a tire pressure monitoring system (TPMS) or other sensors wherein sensor data is sent wirelessly from an electrically isolated device to a receiver connected to the vehicle electrical system. As used herein, the term fob includes both user activated remote control devices and self-triggering wireless sensors which employ backscattering of RF to transmit commands and/or data.

RFID backscatter is the most common example of backscatter communication in use today, but backscatter can be used with other RF protocols such as Wi-Fi and Bluetooth® Low Energy (BLE). Since many vehicles are already being manufactured with Wi-Fi and BLE systems, there exists the potential to incorporate passive backscatter devices that can operate near the vehicle by harvesting these (or other) RF signals and to use the harvested energy to operate an antenna circuit to backscatter these (or other) RF signals to communicate with the vehicle to send authentication data and remote user commands, for example.

When using a vehicle-mounted transmitter to broadcast an RF signal that powers the remote device and that is then backscattered by the remote device, it would be necessary to continuously broadcast the RF while a vehicle is parked. Otherwise, the RKE functions would not be continuously available to the user. This would lead to high power consumption in the vehicle, potentially resulting in depletion of the vehicle battery to a point where engine starting could fail as well as reductions in the life of the battery. Another option would be for the key fob to use ambient RF signals in the environment such as TV or cellular signals for deriving power and for modulated backscattering that could be sensed and decoded by the vehicle. However, sufficient ambient RF is not always available, such as when the vehicle and key are in an underground parking structure or in a remote, rural area.

SUMMARY OF THE INVENTION

In order to provide continuous and reliable operation of a battery-less, backscattering key fob for communicating with a vehicle-mounted receiver, an on-board tag having a substantially identical power harvesting apparatus is used as a reference to evaluate an ability of an ambient RF environment to provide sufficient power to operate the key fob. Based on the evaluation by the on-board tag, the vehicle can power up an RF source in the vehicle to broadcast an RF signal when necessary for use by the key fob. While the vehicle broadcasts the RF signal, it may preferably continue to monitor for the appearance of sufficient ambient RF from another source which would permit the turning off of the vehicle RF transmitter.

Adaptive control of the vehicle transmitter could be sensitive to interaction with other vehicles also equipped with adaptive transmitters in ways that could disrupt availability or create excessive power drain. For example, if a vehicle is parked in a lot along with other similarly equipped vehicles (e.g., at a manufacturing plant, vehicle dealership lot, a place of business, or a shopping mall), in the event that the ambient RF environment becomes too weak then many of the vehicles could activate their RF generators all at once. In view of the resulting surge of RF, all the vehicles could then turn off their RF generators so that the environment again cannot support the backscatter units. The lack of available RF energy would then lead to activation of RF generators in a plurality of the vehicles, and so on. To avoid such a counterproductive loop, each transmitter can encode a tag within its transmitter RF signal to identify the vehicle and to coordinate operation of transmitters. In one particular aspect of the invention, a vehicle comprises a receiver adapted to detect a backscatter communication signal from a wireless fob powered by an RF-harvesting power supply in the fob. A harvesting emulator in the vehicle is responsive to ambient RF around the vehicle to duplicate a concurrent response of the fob power supply. A vehicle-powered RF transmitter is activated to broadcast energizing RF radiation around the vehicle when the duplicated response is below a threshold.

DETAILED DESCRIPTION OF PREFERRED EMBODIMENTS

Figure 1:
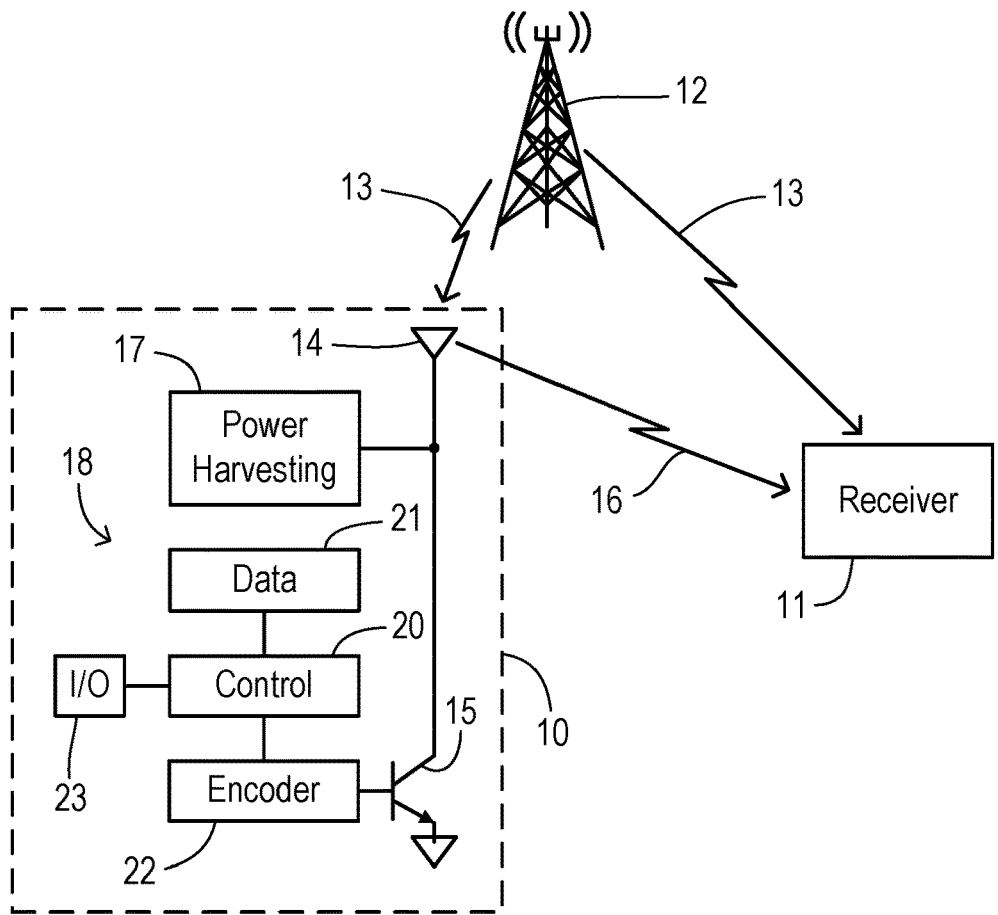
FIG. 1 is a block diagram showing one type of prior art backscatter communication system.

Referring to FIG. 1, a backscattering device 10 as known in the prior art is shown for communicating with a receiver 11 by backscattering ambient RF signals. A broadcast source 12 can include many types of transmission such as television, cellular, AM or FM radio, Wi-Fi, and Bluetooth signals. Ambient RF signals 13 from source 12 contribute to an RF environment in the vicinity of backscatter device 10 and receiver 11.

Device 10 has an antenna 14 for receiving ambient RF signals 13 which is connected in series with a transistor 15 which acts as a controllable load in series with antenna 14 to selectively generate a backscatter RF signal 16 that propagates to receiver 11. By turning the backscattering function on and off, device 10 encodes the RF signal with a desired data signal which can be differentiated from the direct broadcast of RF signal 13 by receiver 11 using various techniques known in the art.

In order to provide batteryless operation, device 10 includes a power harvesting circuit 17 connected with antenna 14. RF energy from antenna 14 may be rectified and stored for supplying various electronic components 18 using techniques known in the art. The harvesting may include the RF signal to be backscattered as well as other RF sources within the RF environment acting upon antenna 14. In addition, other antennae can be provided for harvesting RF sources in other portions of the RF spectrum. The powered electrical components include a control block 20, data memory 21, an encoder 22, and input/output (I/O) components 23. RF backscatter devices have been used for many different applications such as RF tagging systems, remote sensors, and remote controls. Data 21 may include identification data, and I/O block 23 may include sensors such as touch-sensitive switches for manually triggering various user commands to be transmitted by forming command data in control block 20 and then encoding the data in encoder 22 for driving transistor 15 with the encoded data.

In a backscatter system similar to FIG. 1, receiver 11 can also incorporate a broadcast RF source to energize device 10 and to provide an RF signal suitable for being backscattered. Depending on the type of system being implemented, receiver 11 can be an actively powered device or can also be batteryless. When being used in a passenger vehicle, receiver 11 may typically obtain power from a vehicle battery. In batteryless embodiments, receiver 11 could be another backscattering device such as another remote control device or an RFID tag.

Figure 2:
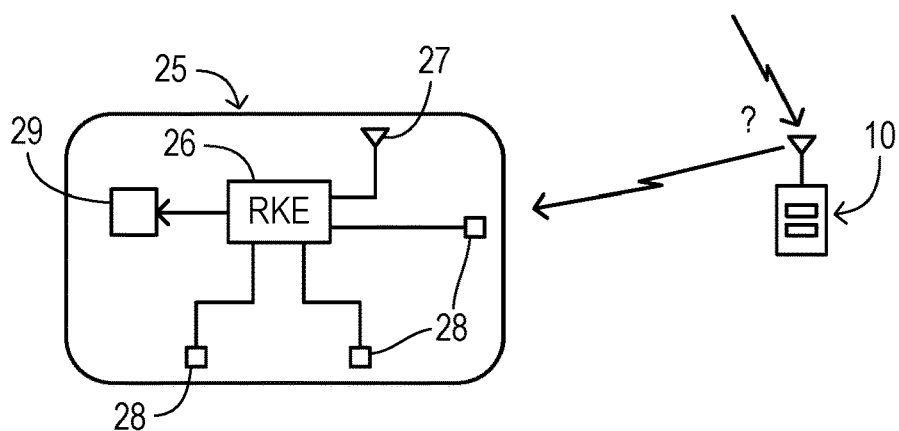
FIG. 2 is a block diagram showing a vehicle communication system using a mobile key fob with RF power harvesting in a remote keyless entry system.

As shown in FIG. 2, backscatter device 10 may be utilized in connection with a remote keyless entry system in a vehicle 25. An RKE controller 26 includes an antenna 27 for receiving backscattered signals from device 10 in order to control various vehicle components such as door locks 28 or the starting of an internal combustion engine 29, for example. However, since vehicle 25 may be parked in various remote or RF shielded locations, the presence of sufficient ambient RF signals in the environment around device 10 for providing sufficient energy for harvesting and for backscattering cannot be guaranteed under all circumstances.

Figure 3:
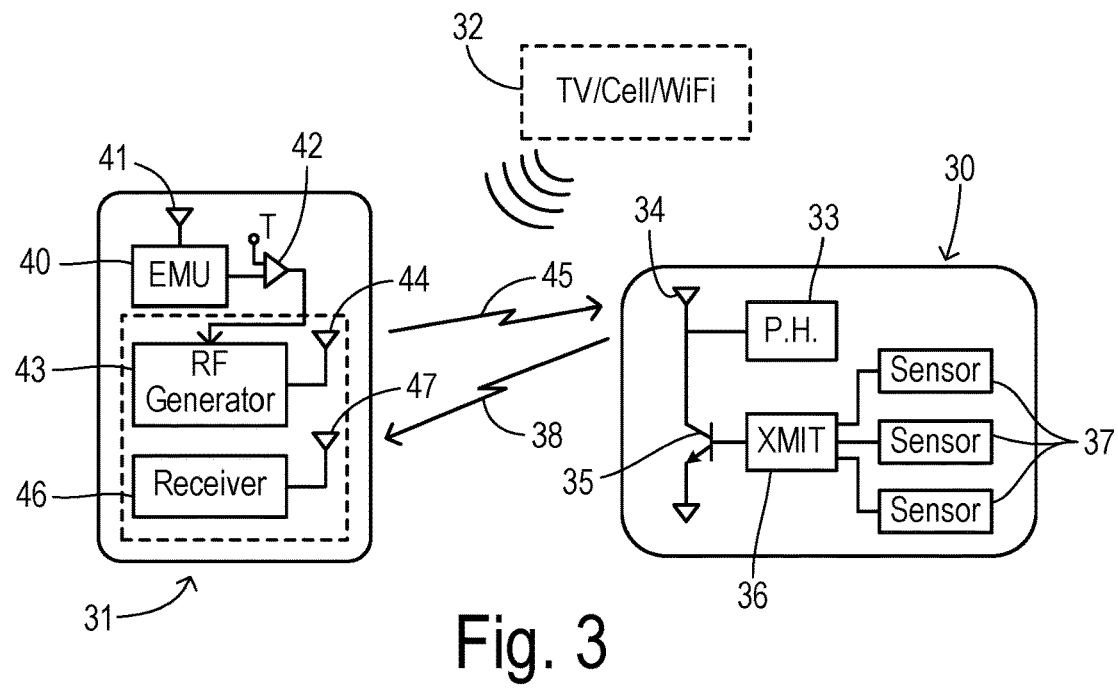
FIG. 3 is a block diagram of one preferred embodiment of the invention using an on-board power harvesting emulator.

In order to ensure continuously available RF energizing signals and a signal appropriate for backscattering for use in a vehicle remote entry system, an embodiment is shown in FIG. 3 which includes a backscattering device 30 for communicating with a vehicle 31. When available, RF signals from an ambient broadcast source 32 (such as TV, cellular, and Wi-Fi broadcast signals) may be relied upon so that power from a vehicle battery (not shown) is conserved. Backscattering device 30 preferably comprises a wireless key fob with a power harvesting circuit 33 connected to an antenna 34 which is connected in series with a transistor switch 35. When sufficient power is being generated by harvesting circuit 33, then a transmitter 36 can respond to sensors 37 which sense manual activations by a user in order to trigger the transmission of authentication and command signals to vehicle 31 by modulating backscattering by antenna 34 via transitions of transistor 35 to produce a backscattered signal 38.

In order to determine whether an RF environment at the location of vehicle 31 and key fob 30 is adequate to provide reliable communication using ambient signals alone, a power harvesting emulator 40 with an antenna 41 is provided in vehicle 31 which is responsive to the ambient RF around vehicle 31 such that it duplicates an RF response which is concurrently occurring in the power harvesting circuit 33 of key fob 30. For example, emulator 40 may include a power harvesting circuit and antenna mounted in vehicle 31 which are substantially identical to those in key fob 30 (emulator 40 should be placed in an arrangement that provides equal sensitivity to the ambient RF environment). The output of emulator 40 (e.g., a measured power level) may be compared with a threshold T by a comparator 42, and the result of the comparison is provided to an RF generator 43 which can output a broadcast signal to a transmit antenna 44. More specifically, when the duplicated response of emulator 40 is below the threshold then RF generator 43 is activated to broadcast an energizing RF radiation signal 45 which propagates to key fob 30. Otherwise, RF generator 43 is deactivated. Energizing radiation signal 45 is adapted to couple with antenna 34 and to provide sufficient power to support harvesting within circuit 33. Furthermore, RF radiation 45 is adapted for backscattering by key fob 30 so that backscattered RF signal 38 can be detected and demodulated by a receiver 46 and antenna 47. Although shown separately, RF generator 43 and receiver 46 can be combined into a single transceiver.

Although energizing RF radiation signal 45 can coincide with the backscattered signal to be detected by receiver 46, the backscattering communication could alternatively be conducted using another RF signal that is present (e.g., in a different frequency spectrum) while signal 45 is only used for harvesting power. As explained later in connection with FIGS. 7 and 8, a receiver and multiband antennae can be included within key fob 30 so that two-way communication can be conducted to allow key fob 30 and vehicle 31 to agree upon a frequency band to be backscattered.

Figure 4:
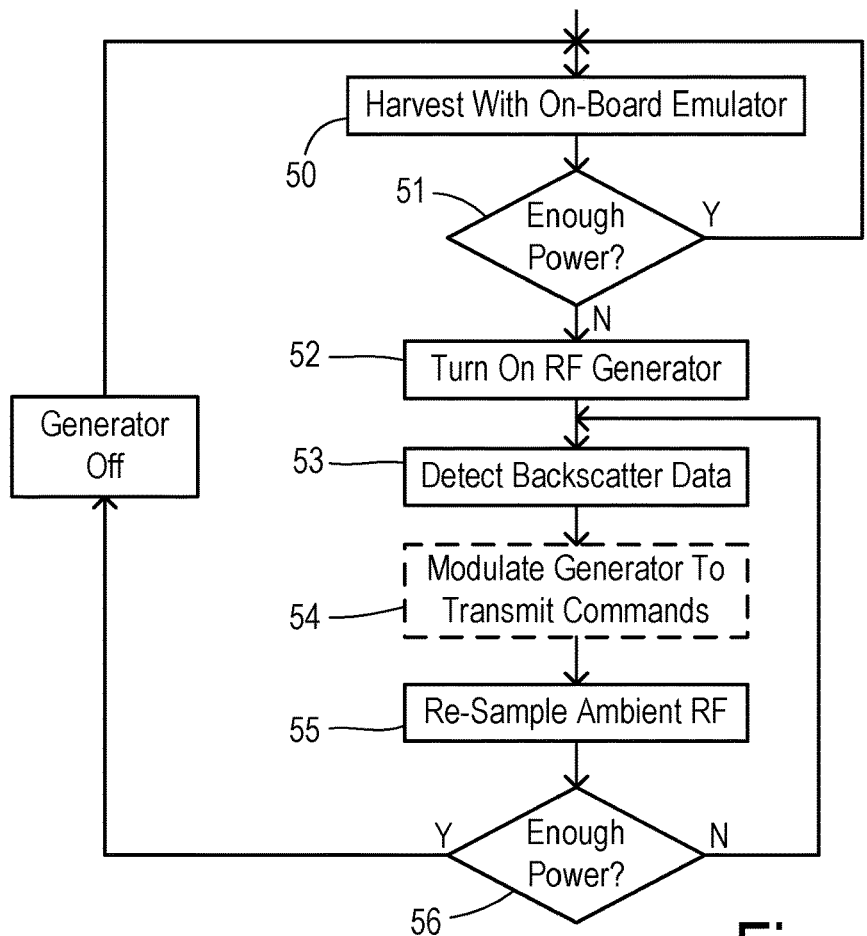
FIG. 4 is a flowchart showing one preferred method of the invention that can be practiced using the apparatus of FIG. 3.

One preferred method of the invention is shown in FIG. 4 wherein the on-board emulator harvests the ambient RF environment to generate power at a level that duplicates (i.e., estimates) the power level being concurrently harvested within the key fob in step 50. In step 51, a check is performed to determine whether the duplicated response is greater than the threshold. The threshold can be set in such a way that the distance between the vehicle and the fob can be estimated and the signal loss between the vehicle and key fob is assumed as the signal degrades with distance. If greater than the threshold, then a return is made to step 50 for continued monitoring of the ambient RF environment. If the power is not enough, then the RF generator is turned on in step 52.

Whenever it is available (e.g., when a user manually activates an input switch), backscatter data is detected in step 53 by the on board receiver. In an optional embodiment having two-way communication, the energizing RF radiation from the RF generator can be modulated in step 54 in order to transmit commands to a key fob with an optional receiver for detecting and demodulating the commands. For example, the key fob may optionally include a receiver circuit that responds to variations in the energizing RF radiation (e.g., a pulse-encoded data signal) for implementing various actions such as setting a backscatter frequency as described in detail more detail below. As used herein, the RF generator can be comprised of any RF transmitting device in the vehicle and does not require a standalone unit. In step 55, the ambient RF environment is periodically resampled and compared in step 56 to the power threshold so that if an ambient RF broadcast source or other nearby sources become present then the RF generator can be turned off, and then a return is made to step 50.

Figure 5:
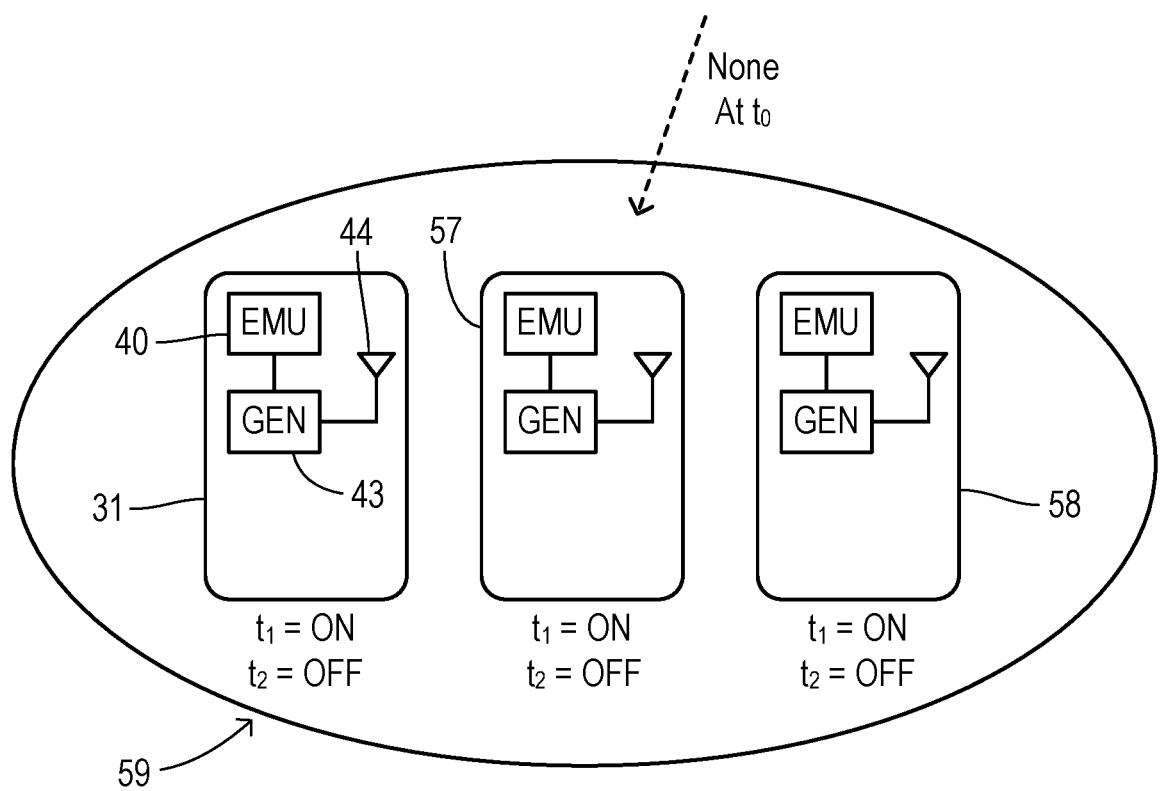
FIG. 5 is a diagram showing several vehicles in close proximity having a potential for undesirable interaction between RF transmitters.

Use of an onboard RF transmitter over significant periods of time with a vehicle being parked can lead to excessive battery drain especially in some particular situations. For example, FIG. 5 depicts a situation wherein vehicle 31 and other vehicles 57 and 58 are parked in a common area 59 such as a parking lot, resulting in the vehicles all being within a maximum operating range of the backscatter communication system. At an initial time to, there is no ambient RF broadcasting signal entering the RF environment which is sufficient to support RF harvesting and/or backscattering. The absence of sufficient ambient RF would be detected in vehicles 31, 57, and 58, causing each of them to turn on their RF generator at a time $t_1$. However, each vehicle then detects the RF being broadcast by the other vehicles. Consequently, all the vehicles may then simultaneously turn off their RF generators at a time $t_2$. A resulting oscillation of the RF generators between their on and off states will fail to enable backscatter communication and will cause excess power drain in the batteries of all the vehicles.

Figure 6:
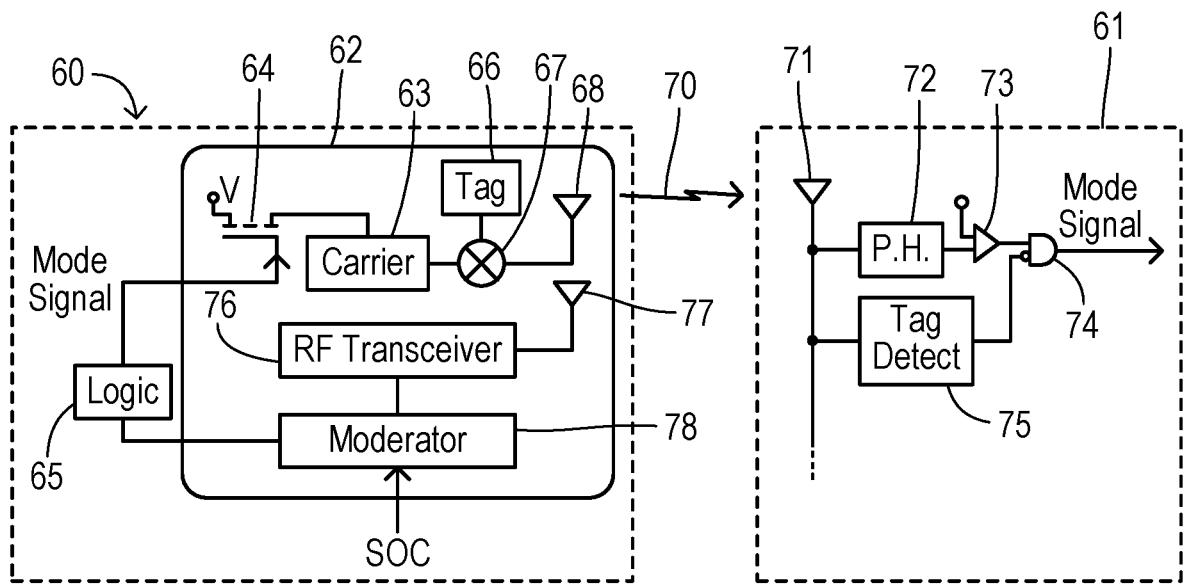
FIG. 6 is a block diagram showing vehicle transceivers for coordinating operation of energizing RF broadcasts among the receivers of FIG. 5.

FIG. 6 shows an embodiment wherein several different alternative modifications can be made to prevent oscillation of the generators and/or to improve sharing of the RF broadcasting function between different vehicles in a way that minimizes power drain. In particular, a vehicle 60 is adapted to interact with a second vehicle 61 in a way that prevents erroneous activation/deactivation cycles of the generators. In an extended embodiment, vehicle interactions can distribute energy consumption among the vehicles in an optimized manner. Relevant circuitry in vehicles 60 and 61 may be identical, but FIG. 6 shows selected details within each vehicle to describe the associated communication functions from the perspective of vehicle 60.

A backscatter communication system 62 in vehicle 60 includes a carrier generator 63 under control of a power supply switch 64. In one embodiment, a logic block 65 could force a Mode signal to assume an off state based on a manual input indicating that the RKE system should not be operational (such as when the vehicle is at the manufacturing plant or being transported to a dealership). With switch 64 turned off, the carrier generator lacks power to operate.

In another embodiment in which RF generator operation can be coordinated between a nearby vehicle, logic circuit 65 determines the Mode signal using additional information to control the gate of switch 64 to selectably activate the RF generator function. A carrier signal from carrier block 63 is modulated in a multiplier 67 according to an identification tag 66 before being radiated as an energizing signal 70 from an antenna 68. In vehicle 61, an antenna 71 receives energizing signal 70 and a power harvesting emulator 72 harvests the signal on antenna 71 to generate a DC output. A measured power of the DC output is compared to a threshold in a comparator 73 having its output connected to one input of an AND gate 74. A tag detector 75 is connected to antenna 71 in order to detect identification tag 66 which has been encoded in energizing signal 70. Tag detector 75 is further adapted to characterize or classifying the detected tag according to whether the presence of vehicle 60 should impact operation of the RF generator function of vehicle 61. For example, identification tags may identify vehicles as being of a common design (e.g., made by the same vehicle manufacturer). This may indicate common/compatible backscattering system making it unnecessary for both vehicles to be broadcasting energizing RF simultaneously. If tag detector 75 determined that it should not operate its RF generator because vehicle 60 is already broadcasting, then an output signal from detector 75 which is coupled to an inverting input of AND gate 74 ensures that a mode signal within vehicle 61 is set to an off state.

In another embodiment, optimal assignment of vehicles for operating their RF generator can be obtained using an RF transceiver 76 with antenna 77 (which would be duplicated in all cooperating vehicles). A moderator circuit 78 may be programed to arbitrate between various vehicles based upon a state of charge (SOC) of each respective vehicle battery or other factors. For example, moderator circuits in the vehicles can agree to cycle between respective vehicles for predetermined periods of time in order to share the power consumption among vehicles. For example, RF transceiver 76 in vehicle 60 transmits its identifying tag via RF transceiver 76 (and/or within RF energizing signal 70) in order to identity itself to nearby vehicles. RF transceiver 76 simultaneously detects ancillary ID tags being broadcast by other vehicles (within dedicated communication links or using respective energizing RF radiation signals), so that a group of vehicles can be identified/tracked which are adapted to cooperate with each other and to arbitrate among them which RF generator will operate at any one time.

In order to avoid depletion of the state of charge of a main battery of a vehicle to a level where critical functions (such as engine starting) cannot be performed, SOC monitoring can be used even when coordination between nearby vehicles is not being employed. For example, the battery SOC can be compared to an power-reserve threshold, and when the measured SOC is below the power-reserve threshold then activation of the RF generator could be inhibited. This may force the user to obtain entry to the vehicle using means other than the backscatter system (e.g., use of a mechanical key or a vehicle-mounted keypad).

Figure 7:
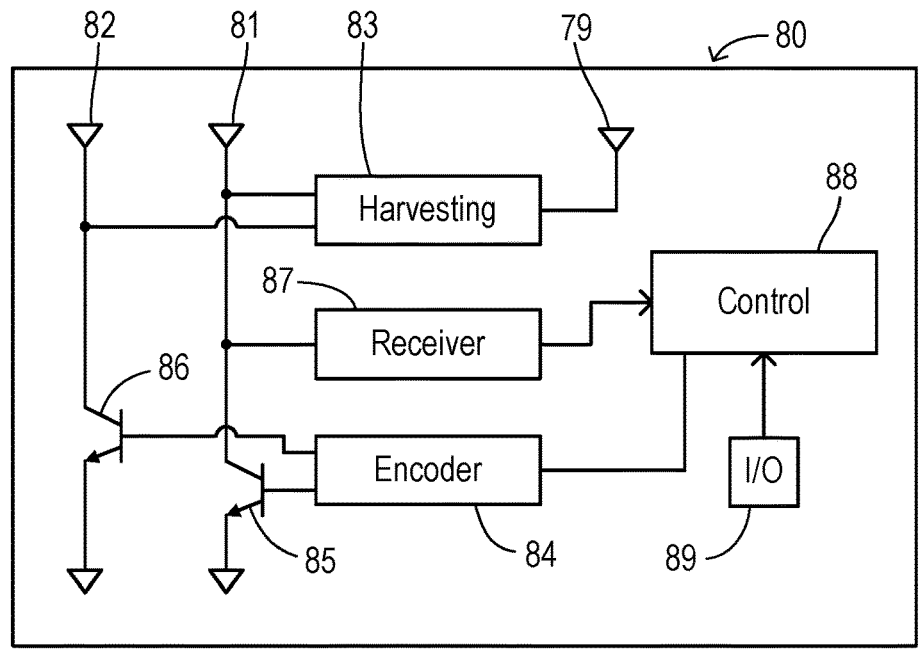
FIG. 7 is a block diagram showing a mobile unit responsive to multiple RF bands.

FIG. 7 shows another embodiment wherein a backscatter device 80 provides multiband operation using a first antenna 81 and a second antenna 82. In some embodiments, a single antenna can alternatively be used to receive/transmit on multiple bands simultaneously. Both antennae 81 and 82 are connected to power harvesting circuit 83. An antenna 79 may also be connected to power harvesting circuit 83 which is dedicated for only collecting energy within a respective frequency band if desired. By harvesting power from a plurality of different frequency bands simultaneously, the likelihood of providing sufficient harvested power is increased.

An encoder 84 may be connected to transistors 85 and 86 connected in series with antennae 81 and 82, respectively. Encoder 84 can drive just one or both transistors 85 and 86 depending on whether it is desired to backscatter ambient signals within each respective frequency band.

In order to allow a vehicle transceiver to set a backscatter frequency band to be used, a receiver 87 is included which is connected with antenna 81, whereby command signals from the vehicle transceiver can be received. A dedicated frequency or channel could be used for transmitting the commands (e.g., using the frequency band received by antenna 81). Command signals are decoded in receiver 87 and provided to a control logic block 88 which controls encoder 84. As in the previous embodiment, input/output components 89 can also be connected to control logic block 88 for inputting user commands to the key fob.

Figure 8:
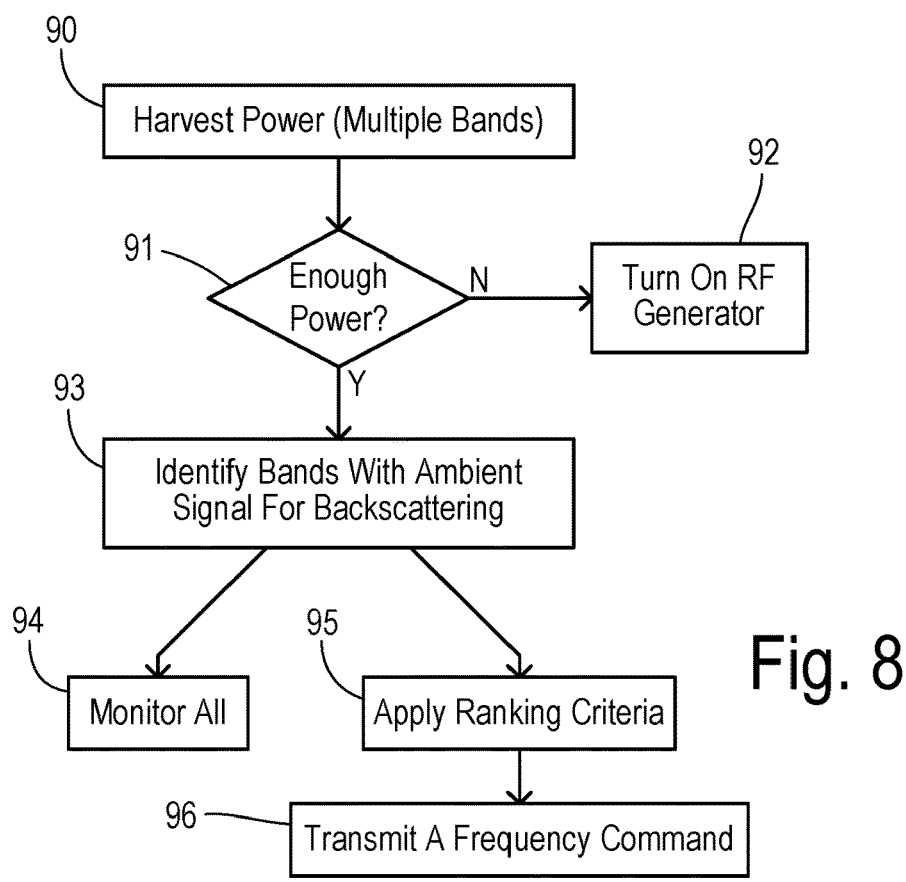
FIG. 8 is a flowchart showing a method for operating a vehicle apparatus to interact with the mobile unit of FIG. 7.

FIG. 8 shows a preferred method using the multiband capabilities of the backscatter device in FIG. 7. Thus, power is harvested within multiple bands in step 90. A substantially identical power harvesting emulator within the vehicle performs a check in step 91 to determine whether sufficient power is available in the multiple bands. If not, then the RF generator is turned on in step 92. In step 93, the vehicle mounted transceiver identifies frequency bands which contain available ambient RF signals that are appropriate for backscattering. In the event that two-way communication is not being used, then the vehicle receiver can monitor all suitable RF signals in step 94 (e.g., allowing the key fob to select an antenna to be modulated). When two-way communication is available, then the vehicle apparatus may apply ranking criteria in step 95 among all available RF signals to select the most desirable signal for backscattering. Then, the vehicle transceiver transmits a frequency command to the fob in step 96 and communication proceeds with the selected frequency band.

What is claimed is:

1. A communication system for a vehicle comprising:
a wireless fob carried outside the vehicle comprising an RF-harvesting power supply responsive to ambient RF signals, and comprising a switchable antenna generating a backscatter communication signal;
a receiver in the vehicle adapted to detect the backscatter communication signal from the wireless fob;
a harvesting emulator in the vehicle responsive to the ambient RF signals to duplicate a concurrent response present in the RF-harvesting power supply of the wireless fob; and
a vehicle-powered RF transmitter in the vehicle activated to broadcast energizing RF radiation around the vehicle when the duplicated response is below a threshold.

2. The communication system of claim 1 wherein the receiver detects backscatter of the energizing RF radiation to receive the backscatter communication signal.

3. The communication system of claim 1 wherein the receiver detects backscatter of an ambient broadcast signal other than the energizing RF radiation.

4. The communication system of claim 1 wherein the RF transmitter modulates the energizing RF radiation to convey a command signal to the fob.

5. The communication system of claim 4 wherein the command signal identifies a frequency band to be backscattered by the fob.

6. The communication system of claim 1 wherein the receiver is comprised of a transceiver adapted to i) modulate the energizing RF radiation according to an identifying tag, and ii) detect ancillary tags broadcast by other vehicles within respective energizing RF radiation of the other vehicles;
wherein activation of the vehicle-powered RF transmitter further depends on ancillary tags being received.

7. The communication system of claim 6 wherein ancillary tags are adapted to identify a group of cooperating vehicles to which the vehicle belongs, and when a detected tag identifies the group then the vehicle-powered RF transmitter is not activated.

8. The communication system of claim 6 further comprising a moderator adapted to communicate with moderators in the other vehicles to cooperatively assign respective vehicle-powered RF transmitters for broadcasting the energizing RF radiation one at a time.

9. The communication system of claim 8 wherein an assigned transmitter is determined in response to a highest one of respective states of charge of respective storage batteries in the vehicles.

10. The communication system of claim 8 wherein an assigned transmitter is determined by cycling between respective vehicles for predetermined periods of time in order to share a power consumption among the respective vehicles.

11. The communication system of claim 1 wherein activation of the vehicle-powered RF transmitter is prevented when a state of charge of a storage battery in the vehicle is below a power-reserve threshold.

12. A vehicular communication method comprising:
operating a backscatter fob to generate a backscatter communication signal using power harvested from a local RF environment including ambient RF signals, wherein the backscatter fob is a portable device carried outside a vehicle;
emulating the power harvesting of the fob in a vehicle mounted emulator receiving the ambient RF signals to provide a measured power; and
activating a vehicle-powered transmitter to boost the local RF environment when the measured power is below a threshold to increase the power harvested in the fob.

13. The method of claim 12 wherein the fob is comprised of a key fob, the method further comprising:
detecting backscatter by the key fob of an RF signal transmitted by the vehicle-powered transmitter to boost the local RF environment; and
demodulating the detected backscatter to recover authentication data and user commands manually selected at the key fob.

14. The method of claim 12 wherein the fob is comprised of a key fob, the method further comprising:
detecting backscatter by the key fob of an ambient RF signal from a remote broadcaster to the local RF environment; and demodulating the detected backscatter to recover authentication data and user commands manually selected at the key fob.

15. The method of claim 12 wherein the step of activating the vehicle-powered transmitter includes modulating an RF signal transmitted by the vehicle-powered transmitter to boost the local RF environment in order to convey command signals from the transmitter to the fob.

16. The method of claim 15 wherein the conveyed command signals identify a frequency band to be backscattered by the fob.

17. The method of claim 12 further comprising:
using RF communication tags within RF signals transmitted by a plurality of vehicle-powered transmitters of respective nearby vehicles in order to track the vehicles; and
coordinating operation of the transmitters of respective vehicles to distribute an energy consumption among the vehicles.

18. The method of claim 17 wherein the coordinating step determines a vehicle with a highest state of charge of a respective storage battery that powers a respective transmitter and assigns the determined vehicle to exclusively transmit the RF signal for boosting the local RF environment.

19. The method of claim 17 wherein the coordinating step cyclically assigns respective vehicles for predetermined periods of time in order to share a power consumption among the respective vehicles.

20. A vehicle comprising:
a receiver adapted to detect a backscatter communication signal from a wireless fob powered by an RF-harvesting power supply;
a harvesting emulator responsive to ambient RF around the vehicle to duplicate a concurrent response of the fob power supply; and
a vehicle-powered RF transmitter activated to broadcast energizing RF radiation around the vehicle when the duplicated response is below a threshold;
wherein the harvesting emulator periodically re-samples the ambient RF during activation of the RF transmitter to update the duplicated concurrent response unaffected by the energizing RF radiation.

* * * * *